United States Patent
Neukam

Patent Number: 5,664,657
Date of Patent: Sep. 9, 1997

[54] GRAVITY CONVEYOR ROLLER

[75] Inventor: Helmut Neukam, Hausmannstätten, Austria

[73] Assignee: P.E.E.M. Förderanlagen Gesellschaft m.b.H., Graz, Austria

[21] Appl. No.: 625,745

[22] Filed: Mar. 29, 1996

[30] Foreign Application Priority Data

Apr. 26, 1995 [AT] Austria .................. GM 231/95

[51] Int. Cl.⁶ .................................. B65G 13/00
[52] U.S. Cl. ................................... 193/35 R
[58] Field of Search ................ 193/35 R; 198/780

[56] References Cited

U.S. PATENT DOCUMENTS

| | | | |
|---|---|---|---|
| 2,827,153 | 3/1958 | Olk et al. | 193/35 R |
| 3,726,376 | 4/1973 | Gotham et al. | 193/35 R |
| 3,890,755 | 6/1975 | Specht | 193/35 R X |
| 3,915,275 | 10/1975 | Specht | 193/35 R |
| 4,054,195 | 10/1977 | Wahl | 193/35 R |
| 4,056,180 | 11/1977 | Gunti | 193/35 R X |
| 4,366,894 | 1/1983 | Huelster | 193/35 R |
| 5,048,661 | 9/1991 | Toye | 193/35 R |
| 5,423,418 | 6/1995 | Furrow | 193/35 R X |

*Primary Examiner*—D. Glenn Dayoan
*Attorney, Agent, or Firm*—Collard & Roe, P.C.

[57] ABSTRACT

A gravity-convyor roller with two longitudinal spars (1) extending mutually parallel, in which a plurality of rollers (2) are held rotatably and which are connected to one another via connecting parts. In order to allow a simple connection of the longitudinal spars it is provided that the longitudinal spars (1) are formed by substantially C-shaped profiles whose straps (5) are located at the outside and whose upper legs (4) have recesses (8) which are open towards vertically downwardly facing bend-offs (6) extending parallel to the straps (5), the recesses (8) extend over a part of the height of the bend-offs (6) and having an inner width smaller in the zone of the bend-offs (6) than their largest inner width extending parallel to the strap (5), the said connecting parts (3) are provided with noses (9) arranged on their face sides engaging in the said recesses (8) arranged in transversal planes extending perpendicularly to the longitudinal spars (1), the cross sections of the said, noses (9) correspond to the recesses (8) in the zone of the legs (4), and the noses (9) having at least one slot (1) extending preferably transversally to the longitudinal spars (1) and having central bores (10) in which clamping screws (15) may be inserted to widen the said slots (14).

3 Claims, 2 Drawing Sheets

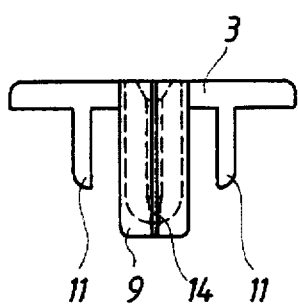
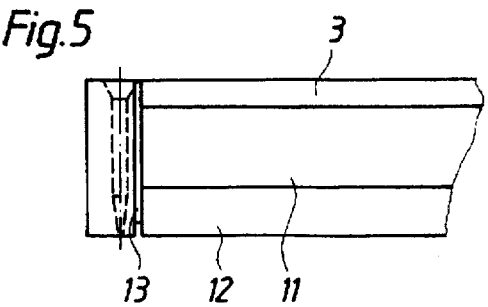
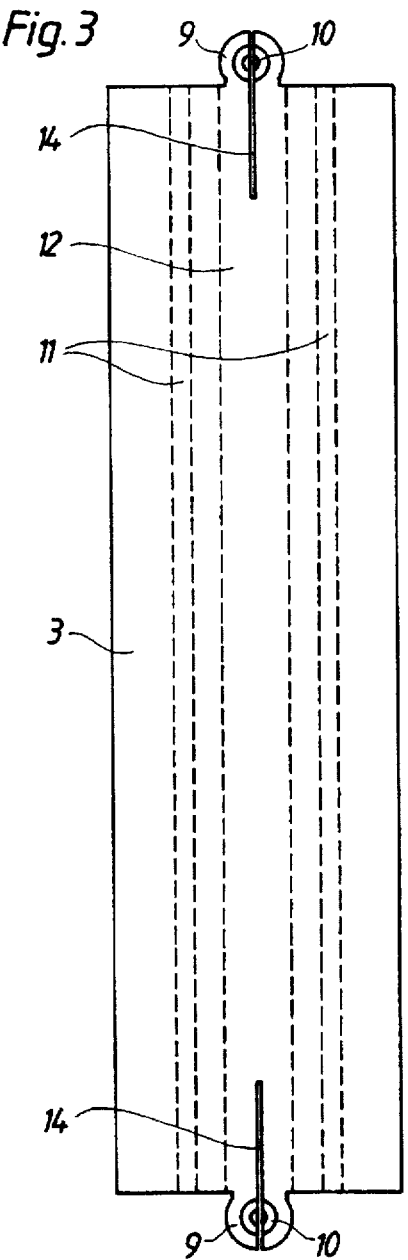
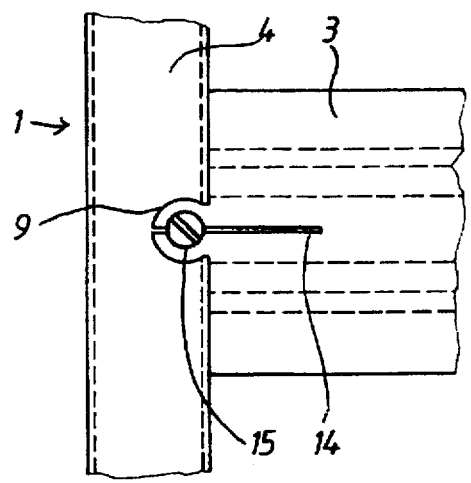
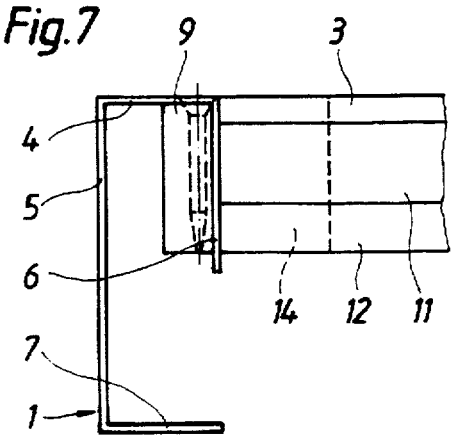

GRAVITY CONVEYOR ROLLER

FIELD OF INVENTION

The invention relates to a gravity-convyor roller with two longitudinal spars extending mutually parallel, in which a plurality of rollers are held rotatably and which are connected to one another via connecting parts.

DESCRIPTION OF PRIOR ART

In such known gravity-roller conveyors metal rods are usually provided for connecting the longitudinal spars which penetrate the straps of the longitudinal spars. The ends of the rods are provided with threads and the adjustment of the required distance between the longitudinal spars occurs by means of pairs of nuts, with the straps of the longitudinal spars being clamped between them.

The disadvantage of such a solution consists in that the ends of the rods project beyond the outer sides of the straps of the longitudinal spars and have to be covered in order to avoid the danger of possible injuries. Moreover, the mounting of the rods is relatively time-consuming.

SUMMARY OF INVENTION

It is the object of the present invention to avoid such disadvantages and to provide a gravity-roller conveyor of the kind mentioned above which is easy to mount and which avoids the laterally projecting parts.

This is achieved in accordance with the invention in a gravity-roller conveyor of the kind mentioned above in that the longitudinal spars are formed by substantially C-shaped profiles whose straps are located at the outside and whose upper legs comprise recesses which are open towards vertically downwardly facing bend-offs extending parallel to the straps, said recesses extend over a part of the height of the bend-offs and having an inner width smaller in the zone of the bend-offs than their largest inner width extending parallel to the strap, said connecting parts are provided with noses arranged on their face sides engaging in said recesses arranged in transversal planes extending perpendicularly to the longitudinal spars, the cross sections of said noses correspond to the recesses in the zone of the legs, and the noses having at least one slot extending preferably transversally to the longitudinal spars and having central bores in which clamping screws may be inserted to widen said slots.

As a result of the proposed measures it is possible to simply insert from above the connecting parts into the upper legs of the longitudinal spars, with the projections of the connecting parts being inserted into the recesses in the zone of the upper leg.

As a result of the provided arrangement of the recesses in the legs of the longitudinal spars it is ensured that the connecting parts can receive and transmit the tensile and pressure forces acting in their longitudinal direction. The adjusting screws lead to a connection between the longitudinal spars and the connecting parts which is free from play.

In many cases such gravity-roller conveyors are monitored by sensors in order to remove or laterally push out from the gravity-roller conveyor the conveyed pieces at intended sites. Such sensors frequently work without contact. However, many such sensors can be disturbed in their function by the metallic connections between the longitudinal spars.

In order to avoid such disturbances it is advantageous to build the gravity-roller conveyor in such a way that the connecting parts are made from plastic and the clamping screws can be sunk right under the upper side of the connecting parts into the noses.

As a result of the proposed measures it is ensured that no metallic parts are situated between the longitudinal spars, as a result of which the function of any sensors arranged there could be disturbed.

If the noses are provided with a notch at their lower end in which the lower edge of the recess engages in the zone of the vertically downwardly facing bend-off and the noses are flush with the upper side of the upper leg of the longitudinal spars and the upper side of the connecting part which sit close with the face side to the bend-offs of the longitudinal spars there is a very simple and secure determination of the position of the connecting parts with respect to the longitudinal spars. Moreover, the edge of the recess in the lower region of the bend-offs can be clamped easily between the walls of the notch. In addition, the proper fit of the connecting elements can be monitored easily by controlling the substantially plane transition from the lengthened parts of the connecting part to the upper sides of the upper leg of the longitudinal spars.

DETAILED DESCRIPTION OF THE INVENTION

The invention is now explained in closer detail by reference to the enclosed drawings, wherein:

FIG. 1 schematically shows a gravity-roller conveyor in an axonometric representation;

FIG. 3 shows a top view on the connecting part;

FIG. 4 shows a front view of the connecting part according to FIG. 3;

FIG. 5 shows a front view of the connecting part according to FIG. 3;

FIG. 6 shows a top view of the connecting zone of a longitudinal spar with a connecting part and FIG. 7 shows a view of the connecting zone according to FIG. 6.

Figure 1:
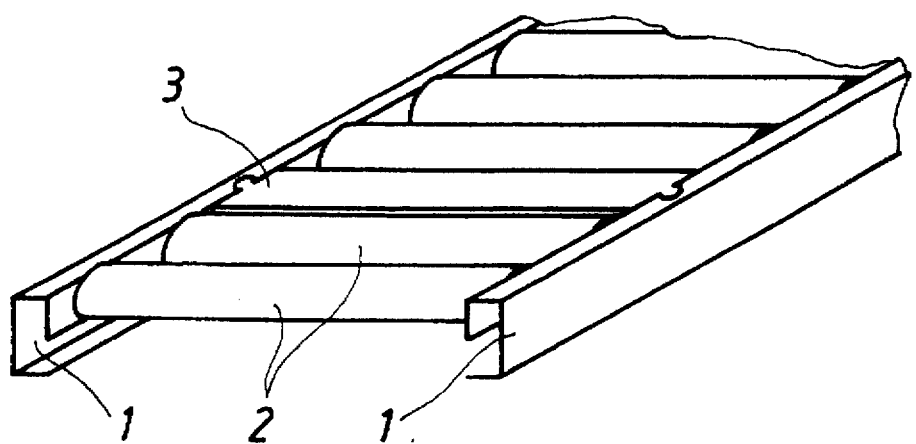
Figure 2:
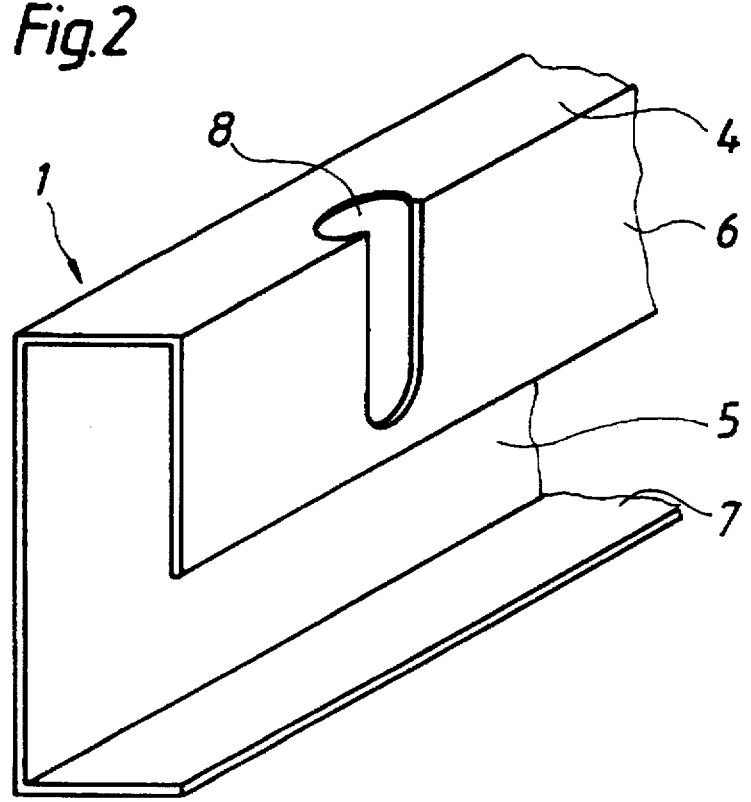
FIG. 2 shows a sectional view of a longitudinal spar of a gravity-roller conveyor according to FIG. 1.

A gravity-roller conveyor is provided with two longitudinal spars 1 which extend substantially parallel with respect to one another, with rollers 2 being held rotatably between them. The longitudinal spars 1 are connected with each other via connecting parts 3.

The longitudinal spars 1 are formed by profiles which are substantially C-shaped in their cross section and whose upper leg 4 is followed by a bend-off 6 extending parallel to strap 5. The lower leg 7 is not provided with a bend-off.

For the purpose of connecting the longitudinal spars 1, their upper legs 4 are provided in regular intervals with recesses 8 which are open towards the bend-off 6. Said recess 8 extends, starting out from leg 4, over a part of the height of bend-off 6. As can be seen from FIG. 6, the inner width of recess 8 in the zone of the bend-off 6 is smaller than the largest inner width of recess 8 as measured parallel to the strap, with the largest inner width of the recess 8 being given by its diameter in the embodiment illustrated here.

Principally, instead of having the shape of an arc of a circle the recess could also be provided with a limitation extending substantially in the shape of a triangle or trapezoid. The important aspect in this respect is only that the recess is provided in one region with a larger inner width than in the region of the bend-off 6 and thus its opening.

The connecting parts 3 are made from plastic and are provided with noses 9 at either of its two face sides which in a section guided parallel to the upper side of the connecting part 3 are provided with a cross section corresponding to the recess 8 in the zone of the upper leg 4 of the longitudinal spar 1. Moreover, the noses 9 are provided with a bore 10 for receiving a clamping screw.

The connecting parts 3 are provided at their lower sides with three ribs 11, 12, of which the outer ribs 11 are provided with a smaller height and thickness than the middle ribs 12 (FIG. 5). The middle rib 12 is provided with a thickness corresponding substantially to the outer diameter of the noses 9.

The noses 9 are offset from the middle rib 12 by a groove 13 which extends in the shape of an arc of a circle in the zone of the lower end of nose 9, as is indicated in FIG. 4 with the broken line, and thus corresponds to the course of the edge of recess 8 in the zone of bend-off 6.

As can be seen from FIGS. 3 and 4, the connecting parts 3 are provided at either of their ends with slots 14 which extend over the entire height of noses 9 and the middle ribs 12. These slots 14 extend in the longitudinal direction of the connecting parts and penetrate the noses 9. By inserting clamping screws 15 (FIG. 6) into the bores 10 of noses 9 it is possible to widen the slots 14 and thus to achieve a secure anchoring of the connecting parts in the longitudinal spars 1 for the noses 9 inserted into the recesses 8.

The recesses 8 in the two longitudinal spars 1 are each arranged in a transversal plane standing vertically to the longitudinal spars, as can be seen from FIG. 1. By inserting the noses 9 of connecting parts 3 and the subsequent insertion of clamping screws 15 into the bores of noses 9 it is possible to securely connect the longitudinal spars 1 with each other, with no metal parts being situated between the longitudinal spars and thus preventing any disturbance of sensors for detecting piece goods located on the gravity-roller conveyor.

The bores 10 are provided on the upper side of noses 9 with counterbores for receiving the heads of clamping screws 15.

As can be seen from FIG. 7, the connecting parts 3 do not project beyond the upper side of longitudinal spars 1 which are below the plane as defined by the uppermost generatrixes of the rollers 2.

I claim:

1. A gravity-convyor roller with two longitudinal spars (1) extending mutually parallel, in which a plurality of rollers (2) are held rotatably and which are connected to one another via connecting parts, characterized in that the longitudinal spars (1) are formed by substantially C-shaped profiles whose straps (5) are located at the outside and whose upper legs (4) comprise recesses (8) which are open towards vertically downwardly facing bend-offs (6) extending parallel to the straps (5), said recesses (8) extend over a part of the height of the bend-offs (6) and having an inner width smaller in the zone of the bend-offs (6) than their largest inner width extending parallel to the strap (5), said connecting parts (3) are provided with noses (9) arranged on their face sides engaging in said recesses (8) arranged in transversal planes extending perpendicularly to the longitudinal spars (1), the cross sections of said noses (9) correspond to the recesses (8) in the zone of the legs (4), and the noses (9) having at least one slot (14) extending preferably transversally to the longitudinal spars (1) and having central bores (10) in which clamping screws (15) may be inserted to widen said slots (14).

2. A gravity-roller conveyor as claimed in claim 1, characterized in that the connecting parts (3) are made from plastic and the clamping screws (15) can be sunk right under the upper side of the connecting parts (3) into the noses (9).

3. A gravity roller conveyor as claimed in claim 1, characterized in that the noses (9) are provided with a notch (13) at their lower end in which the lower edge of the recess (8) engages in the zone of the vertically downwardly facing bend-off (6) and the noses (9) are flush with the upper side of the upper leg (4) of the longitudinal spars (1) and the upper side of the connecting part (3) which sit close with the face side to the bend-offs (6) of the longitudinal spars (1).

* * * * *